United States Patent
Ando et al.

(10) Patent No.: US 8,258,938 B2
(45) Date of Patent: Sep. 4, 2012

(54) TIRE INFLATION PRESSURE DETECTING DEVICE

(75) Inventors: Masakuni Ando, Saitama (JP);
Kunihiko Fukui, Saitama (JP); Yuki Kanai, Saitama (JP); Makoto Hattori, Saitama (JP); Koji Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 12/570,648

(22) Filed: Sep. 30, 2009

(65) Prior Publication Data
US 2010/0134270 A1    Jun. 3, 2010

(30) Foreign Application Priority Data
Nov. 28, 2008  (JP) .................................. 2008-304177

(51) Int. Cl.
*B60C 23/00* (2006.01)
(52) U.S. Cl. ........ 340/447; 340/427; 340/442; 340/445; 340/448; 73/146.3; 73/146.8
(58) Field of Classification Search .................. 340/447, 340/427, 442, 445, 448; 73/146.3, 146.8
See application file for complete search history.

(56) References Cited

U.S. PATENT DOCUMENTS

| | | | |
|---|---|---|---|
| 6,278,363 B1* | 8/2001 | Bezek et al. ................. | 340/442 |
| 6,825,759 B2* | 11/2004 | Yamagiwa et al. ........... | 340/445 |
| 6,888,450 B2* | 5/2005 | Sasaki et al. ................. | 340/445 |
| 7,015,813 B1 | 3/2006 | Loster | |
| 2004/0183658 A1 | 9/2004 | Yamagiwa et al. | |
| 2004/0233049 A1 | 11/2004 | Harada et al. | |

FOREIGN PATENT DOCUMENTS

| | | |
|---|---|---|
| DE | 102 03 620 A1 | 5/2003 |
| DE | 60 2004 000 613 T2 | 8/2006 |
| DE | 602 25 658 T2 | 4/2009 |
| JP | 2006-240410 A | 9/2006 |
| JP | 2007-269202 A | 10/2007 |

* cited by examiner

*Primary Examiner* — Tai T Nguyen
(74) *Attorney, Agent, or Firm* — Birch, Stewart, Kolasch & Birch, LLP (57) ABSTRACT

A pressure detection unit includes a front-wheel transmitter and a rear-wheel transmitter operatively connected to wheel rims of a front wheel and a rear wheel, respectively. Inflation pressure signals transmitted from the front-wheel transmitter and the rear-wheel transmitter are received by a receiver. The receiver is arranged to be offset outward of a straight line connecting the front-wheel transmitter and the rear-wheel transmitter in the vehicle-body width direction. More specifically, the receiver is arranged in a space surrounded by a front cowl and a side panel, the space being between a coolant reserve tank and a radiator. The single receiver receives the signals transmitted from the front-wheel transmitter and the rear-wheel transmitter.

15 Claims, 9 Drawing Sheets

| 21 | FRONT-WHEEL TRANSMITTER |
| 22 | REAR-WHEEL TRANSMITTER |
| 232 | RF CIRCUIT |
| 233 | MICROCOMPUTER |
| 234 | POWER SUPPLY |
| 235 | INPUT-OUTPUT CIRCUIT |
| 26 | METER CONTROLLER |
| 27 | COMMUNICATION CONTROLLER |

TIRE INFLATION PRESSURE DETECTING DEVICE

CROSS-REFERENCE TO RELATED APPLICATIONS

The present application claims priority under 35 USC 119 to Japanese Patent Application No. 2008-304177 filed on Nov. 28, 2008 the entire contents of which are hereby incorporated by reference.

BACKGROUND OF THE INVENTION

1. Field of the Invention

The present invention relates to a tire inflation pressure detecting device. In particular, the present invention relates to a tire inflation pressure detecting device having a layout capable of improving the reception of a condition regarding the result of a tire inflation pressure detection.

2. Description of Background Art

A tire inflation pressure detecting device is known that regularly measures the inflation pressures of tires and enables a checking of the inflation pressures of the respective tires from an operator's seat. Japanese Patent Application Publication No. 2006-240410 proposes a tire inflation pressure detecting system for a two-wheeled vehicle wherein tire inflation pressure sensors are respectively attached to front and rear wheels each include a transmitting circuit and by using the transmitting circuits, the tire inflation pressure sensors transmit signals indicating tire inflation pressures detected by the respective tire inflation pressure sensors. The signals are received by a first tuner and a second tuner which are provided in the front and rear of a vehicle body, respectively. In this system, the first and second tuners are provided to the front and rear of an engine, that is, in a widthwise central portion of the vehicle body.

As proposed in Japanese Patent Application Publication No. 2007-269202, a device is disclosed which has a controller system arranged under a rider's seat for detecting the presence or absence of a rider and a loading status of a load on the basis of inflation pressures. The controller system includes an antenna unit that receives the inflation pressure signals of tires.

As described above, in a conventional tire inflation pressure detecting system or device for a two-wheeled vehicle, while sensors and transmitters for tire inflation pressure detection are attached to rims of tire wheels, each of the tuners or the antenna unit is provided in a widthwise central portion of a vehicle body.

More specifically, a transmitter and a receiver for a tire inflation pressure signal are both located in the widthwise central portion of the vehicle body, and arranged substantially in a straight line along a front-rear direction of the vehicle body. Consequently, there are constituent elements of the vehicle such as an engine, a suspension mechanism and a muffler between the transmitter and the receiver. Thus, the reception status of radio waves transmitted from the transmitter sometimes is decreased.

On the other hand, in the device disclosed in Japanese Patent Application Publication No. 2007-269202, tuners, more specifically receivers, are arranged in vicinities of transmitters attached to the front and rear wheels. Thus, good reception conditions can be expected. However, in this device, plural receivers are necessary. Therefore, there have been problems wherein arrangement spaces for the receivers are respectively required. Thus, the interconnections become complex.

SUMMARY AND OBJECTS OF THE INVENTION

It is an object of an embodiment of the present invention is to provide a tire inflation pressure detecting device capable of favorably receiving, through a single receiver, tire inflation pressure signals transmitted from transmitters at the front and rear wheels.

According to an embodiment of the present invention provided for achieving the above object, a tire inflation pressure detecting device includes tire inflation pressure sensors; transmitters that transmit signals indicating inflation pressures detected by the tire inflation pressure sensors, respectively; and a receiver that receives the signals transmitted by the transmitters. A pair of one of the tire inflation pressure sensors are provided wherein one of the transmitters is provided to each of wheel rims of a front wheel and a rear wheel of a two-wheeled vehicle. In the tire inflation pressure detecting device, the receiver is arranged in a region outward, in a vehicle-body width direction, of a straight line connecting the wheel rims of the front and rear wheels, and forward of a rider's seat.

Additionally, according to an embodiment of the present invention the two wheeled vehicle includes: a vehicle-body frame including a head pipe in a front portion of the vehicle body; a pair of right and left main tubes extending obliquely downward and rearward to the right and to the left, respectively, from the head pipe; and a front cowl covering an area extending from a front portion of the head pipe to front portions of regions outside of the respective main tubes in the vehicle-body width direction, and the receiver is arranged in a space formed between one of the main tubes and the front cowl.

Additionally, according to an embodiment of the present invention, the receiver is arranged under a side panel covering an upper portion of a space between one of the main tubes and the front cowl.

Additionally, according to an embodiment of the present invention, the two-wheeled vehicle includes a pair of right and left radiators, which are arranged respectively in the regions outside of the respective main tubes in the vehicle-body width direction so that a face of a radiator core included in each of the radiators is substantially opposed to the front cowl, and the receiver is arranged close to one of the radiators.

Additionally, according to an embodiment of the present invention the receiver incorporates a receiving antenna.

Additionally, according to an embodiment of the present invention the receiver includes a microcomputer that compares the tire inflation pressure indicated by the signal received by the receiver to a referential inflation pressure; inputs a result of the comparison to a meter unit of the vehicle; and causes the meter unit to give a predetermined warning indication.

According to an embodiment of the present invention, the receiver that receives inflation pressure signals is offset outward of a straight line connecting positions where the two transmitters are arranged in the vehicle-body width direction. Thus, a positional relation between the receiver and the transmitters makes it difficult for radio waves to be blocked by the rider, the vehicle-body frame and the like, whereby favorable reception performances can be achieved. Additionally, since it is only necessary to provide the single receiver common to the two transmitters, securing of an installation space is easy, and attachment work can be simplified.

According to an embodiment of the present invention, the receiver is provided outward of the main frame, that is, in a position where few metal structure components are provided, whereby a communication failure is not likely to occur. In addition; the receiver is arranged by effectively utilizing a space covered by the front cowl and the side panel.

According to an embodiment of the present invention, the receiver integrally incorporates the receiving antenna, whereby securing an arrangement space for the antenna and complexity in interconnections can be avoided.

Additionally, according to an embodiment of the present invention, whether a status of the tire inflation pressure is appropriate can be recognized through the meter unit of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
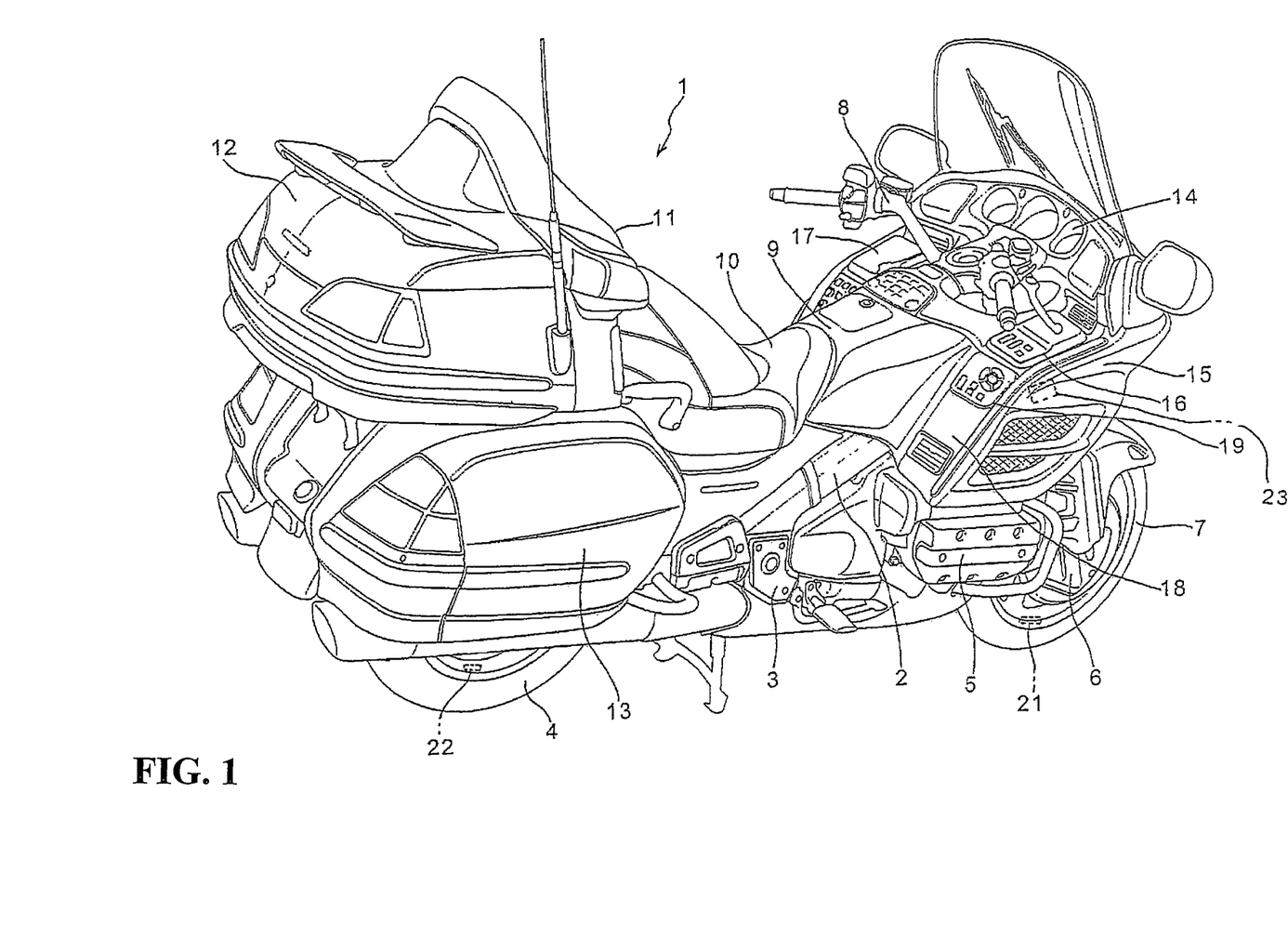
FIG. 1 is a perspective view of a motorcycle provided with a tire inflation pressure detecting device according to one embodiment of the present invention.
Figure 2:
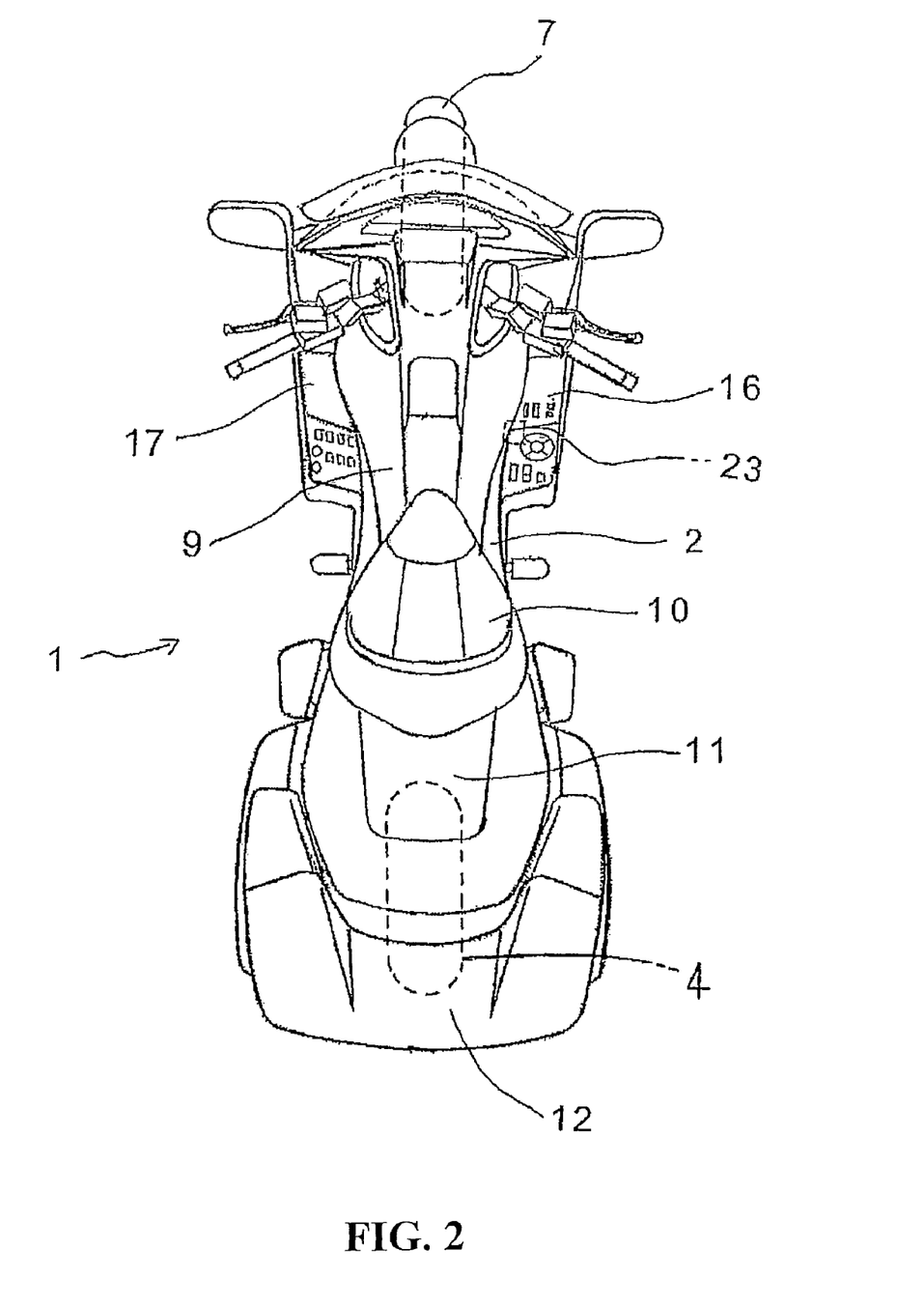
FIG. 2 is a plan view of the motorcycle provided with the tire inflation pressure detecting device according to one embodiment of the present invention.

One embodiment of the present invention will be described below with reference to the accompanying drawings. As illustrated in FIGS. 1 and 2, a motorcycle 1 includes, as a main frame, a pair of right and left tube frames 2 extending from head pipe 1H obliquely downward and rearward to the right and to the left. In a vehicle-body width direction between the tube frames 2, the width increases from the head pipe 1H, and the tube frames 2 extend rearward therefrom to be coupled to pivot plates 3. The pivot plates 3 are each a member that holds a shaft provided for pivotally supporting a rear wheel 4 so as to be able to swing upwards and downwards. Under the tube frames 2, an engine 5 is arranged. In this embodiment, the engine 5 is of a horizontal opposition type in which cylinder heads are located outward in the vehicle-body width direction. The engine 5 being a reinforcing member is coupled to the tube frames 2.

A front wheel 7 is rotatably supported at a lower end of a front folk 6 turnably supported by the head pipe. In addition, a steering handle 8 is attached to an upper portion of the front folk 6. A fuel tank 9 is arranged above the engine 5. A rider's seat 10 and a pillion seat 11 are provided in the rear of the fuel tank 9. A main trunk 12 is arranged in the rear of the pillion seat 11, and side bags 13 are attached to the right and left sides below the main trunk 12.

In front of the steering handle 8, a meter unit 14 is provided, and a front cowl 15 is arranged in a manner corresponding to a front portion of the steering handle 8 (more specifically, a front portion of the head pipe) and to front side portions of the fuel tank 9. More specifically, the front cowl 15 is a member that covers side portions of a front portion of the vehicle body. Furthermore, an upper surface of the front cowl is covered by the meter unit 14, and also, is covered by side panels 18 extending from both the right-hand and left-hand sides of the meter unit 14 rearward with respect to the vehicle body, and being extended obliquely downward.

On a substantially horizontal surface of the side panel 18, a lid 16 used for inside maintenance is attached. On the lid 16, for example, a switch used for meter panel operation, a switch used for a heater, and the like are attached. In addition, on a sloping surface of the side panel 18, a navigation panel switch 19 can be provided for example.

A lid 17 is provided on a substantially horizontal surface of the side panel 18 in the left-hand side of the vehicle body. Unlike the lid 16 in the right-hand side, the lid 17 is configured to cover a storage pocket (unillustrated) thereunder, so that the user may use the storage pocket freely by opening and closing the lid 17. Note that, since a portion under the lid 16 in the right-hand side houses a radiator, a coolant reserve tank, a cruise controller and the like which are to be described later, the portion is not provided with a storage pocket. However, applicability of the present invention is irrespective of a modification in which the reserve tank and the like are installed in other areas to make a space available for providing a storage pocket in the portion.

To a back side surface of the side panel 18, or, inside of the front cowl 15, a receiver 23 that receives tire inflation pressure signals transmitted from transmitters of later described pressure detecting units is attached. An attachment position of the receiver 23 is set to be under the lid 16, and to be any one of an upper portion of the radiator and an upper portion of a side surface thereof, which will be described further in detail later.

Transmitters 21 and 22 that measure inflation pressures of the front wheel 7 and a rear wheel 4, and transmit measurement results and IDs are attached to rims of tire wheels of the front wheel 7 and the rear wheel 4, respectively (details thereof will be described later).

Figure 3:
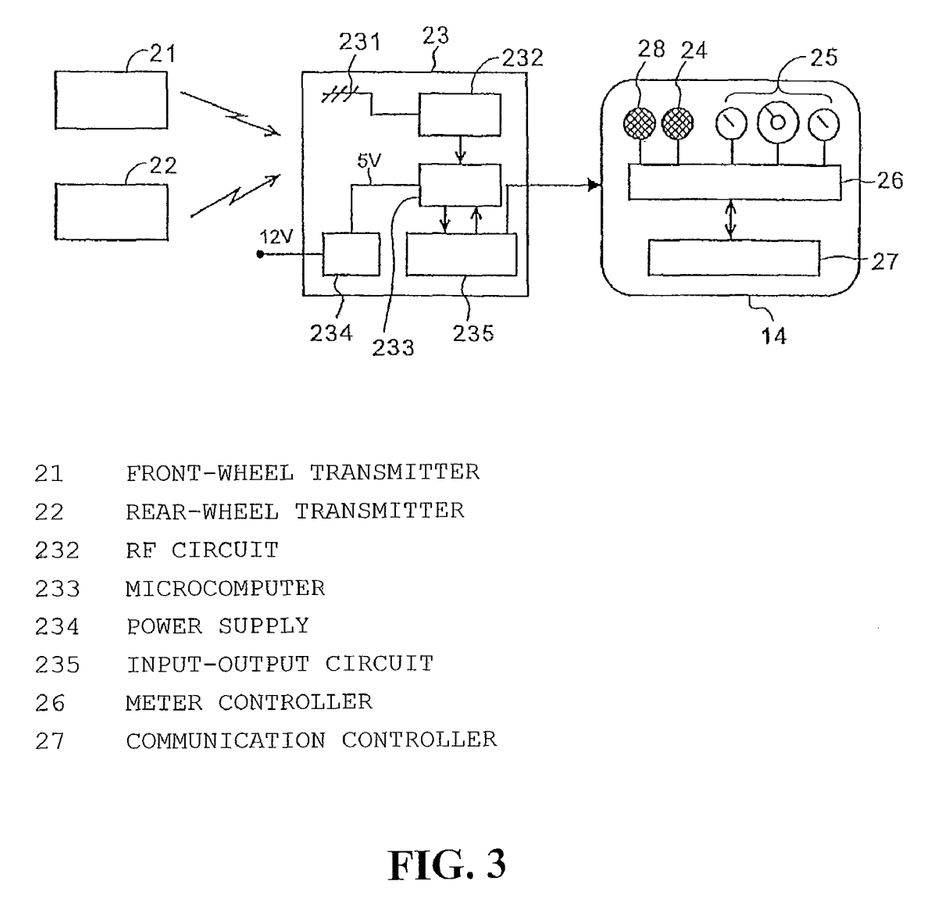
FIG. 3 is a system block diagram of the tire inflation pressure detecting device.

FIG. 3 is a system block diagram of the tire inflation pressure detecting device. The tire inflation pressure detecting device is composed of a transmitting device composed of the front-wheel transmitter 21 and the rear-wheel transmitter 22 attached to the front wheel 7 and the rear wheel 4, respectively; a receiver 23 that receives an ID and information (tire inflation pressure signal) transmitted from each of the front wheel transmitter 21 and the rear wheel transmitter 22, the information indicating a tire internal inflation pressure; and a tire inflation pressure indicator 24 that gives a predetermined indication according to the information received by the receiver 23.

Each of the front-wheel transmitter 21 and the rear-wheel transmitter 22 is fixed to a rim of a tire wheel, and is formed integrally with a tire valve (check valve) (later described).

The receiver 23 is composed of an antenna 231, an RF circuit (receiving circuit) 232, a microcomputer 233, a power supply circuit 234 and an input-output circuit 235. The power supply circuit 234 transforms a voltage of 12 volts supplied from an in-vehicle battery into a constant voltage of 5 volts that is suitable as an input voltage for the microcomputer 233. The RF circuit 232 extracts each signal having predetermined frequencies (frequencies transmitted by the transmitters) from radio waves received through the antenna 231, digitalizes the extracted signal, and inputs the digitalized signal to the microcomputer 233. The microcomputer 233 compares, to referential values (two-step values), an inflation pressure indicated by the tire inflation pressure signal inputted from the RF circuit 232, and, if the inflation pressure is lower than any of the referential values, sends out the detected information to the tire inflation pressure indicator 24.

The tire inflation pressure indicator 24 is configured as a part of the meter unit 14, and is controlled by a meter controller 26 that controls indications of meters provided on the meter unit 14 which are speedometer and the like 25; and a communication controller 27.

The referential values for each of the tire inflation pressures are set, for example, to a value 10% smaller than a regulated inflation pressure and to a value 20% smaller than the regulated inflation pressure. If the tire inflation pressure is less than a value 10% smaller than the regulated inflation pressure and is equal to or more than a value 20% smaller than the regulated inflation pressure, the microcomputer 233 judges that the inflation pressure is slightly low, and transmits a signal to the meter controller 26 via the communication controller 27, the signal causing a lamp (an LED or the like) of the tire inflation pressure indicator 24 on the meter unit 14 to blink. In response to this signal, the meter controller 26 causes the tire inflation pressure indicator 24 to perform a blinking operation.

Furthermore, if the tire inflation pressure is less than a value 20% smaller than the regulated inflation pressure, the microcomputer 233 judges that the inflation pressure is considerably low, and transmits a signal to the meter controller 26 via the communication controller 27, the signal causing the lamp of the tire inflation pressure indicator 24 on the meter unit 14 to continuously light up. In response to this signal, the meter controller 26 gives a warning indication by causing the tire inflation pressure indicator 24 to perform a continuous lighting-up operation.

Note that, aside from the tire inflation pressure indicator 24, a system failure indicator 28 issues a warning by being illuminated when the tire inflation pressure detecting device has a system failure.

Figure 4:
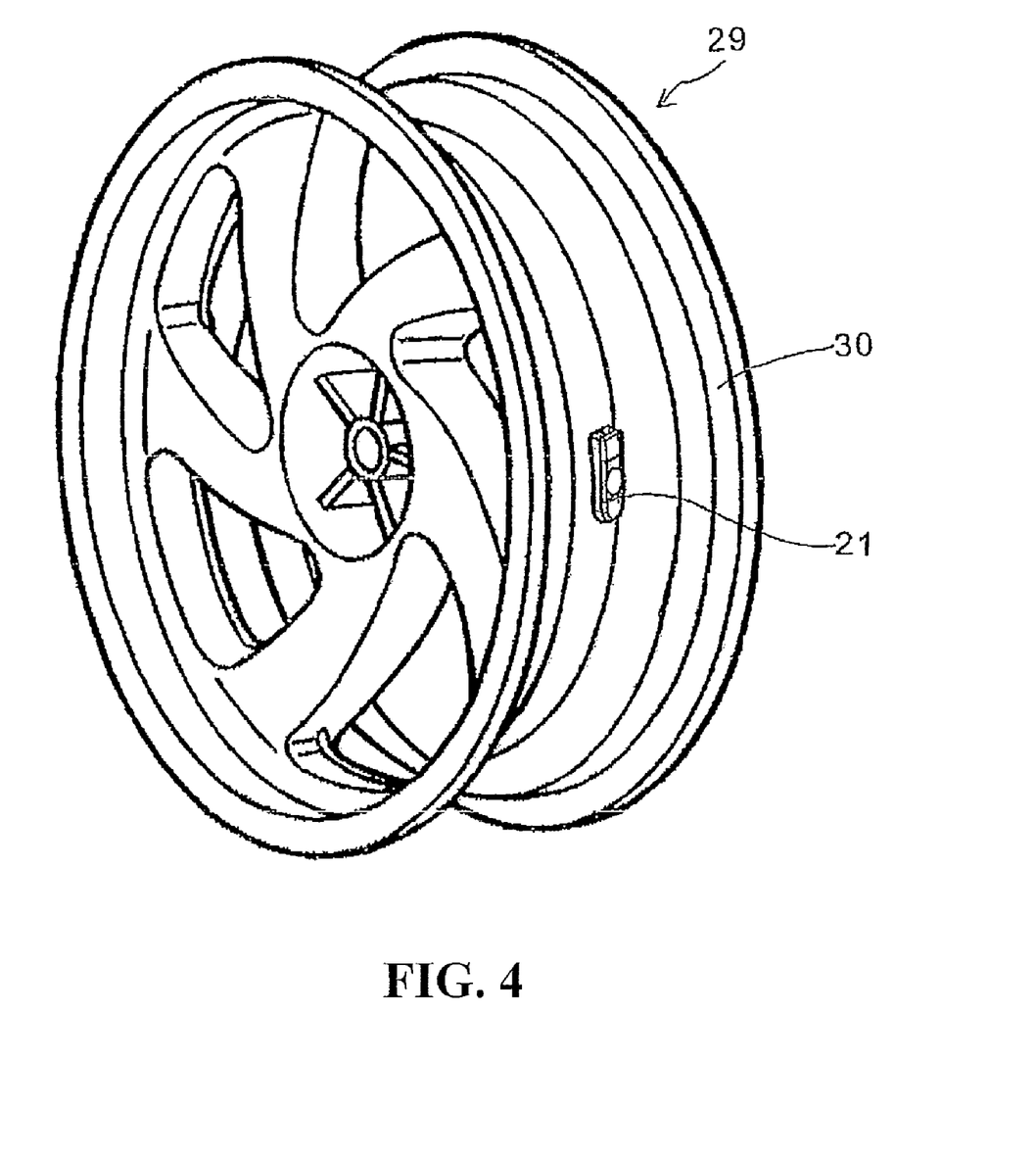
FIG. 4 is a perspective view of a tire wheel including the tire inflation pressure detecting device.
Figure 5:
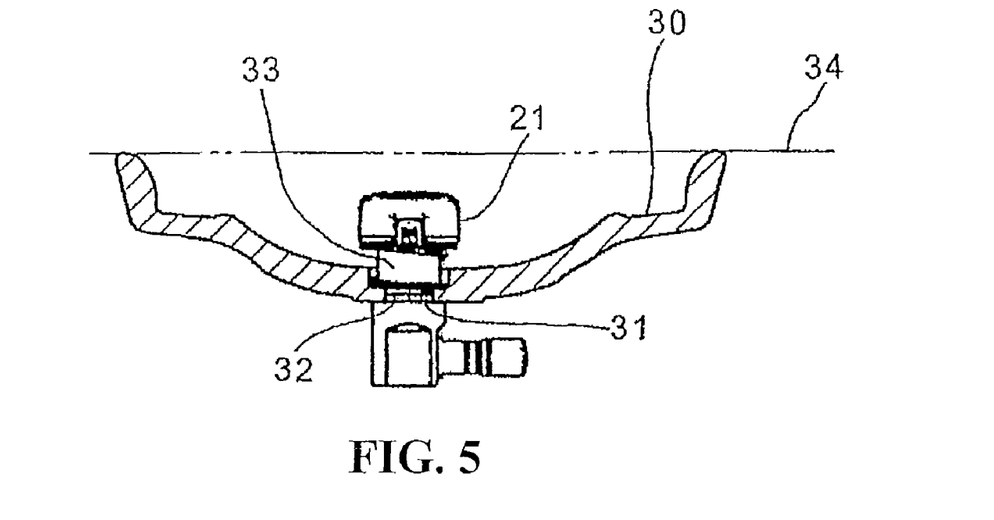
FIG. 5 is a cross-sectional view of a rim of the tire wheel including the tire inflation pressure detecting device.
Figure 6:
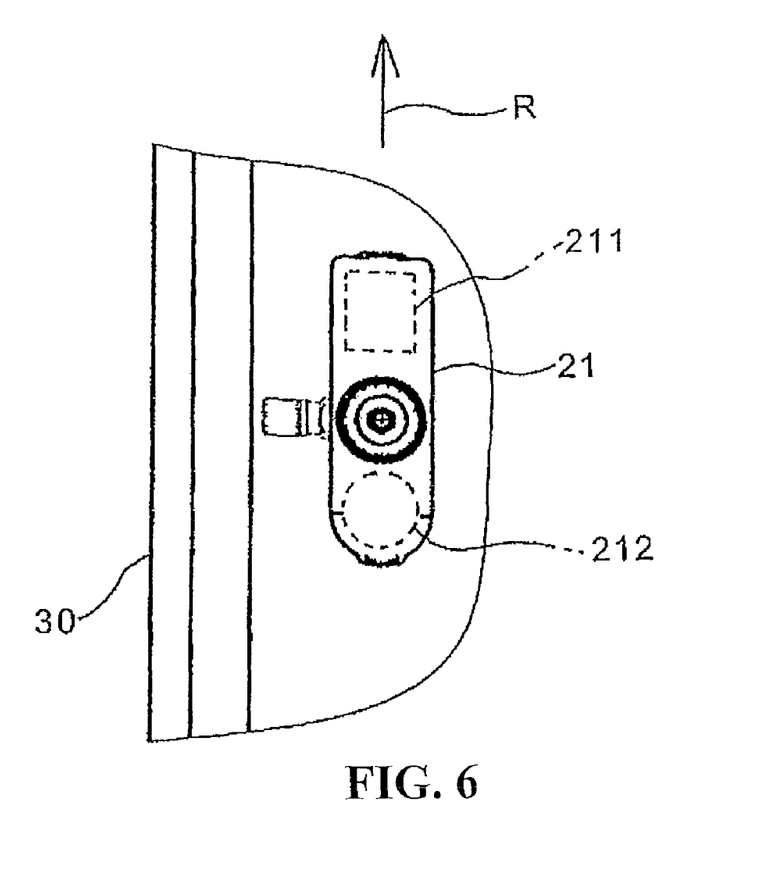
FIG. 6 is an enlarged view of a main portion of an outer circumferential surface of the rim of the tire wheel.

As illustrated in FIGS. 4 to 6, the front-wheel transmitter 21 and the rear-wheel transmitter 22 are fixed to the respective wheel rims in a similar manner. Therefore, a description thereof will be directed to the front-wheel transmitter 21. The front-wheel transmitter 21 is a valve integrated type, that is assembled integrally to a cylindrical body (a valve main body) that houses a check valve, and constitutes the tire inflation pressure detecting device.

As shown in FIGS. 4 to 6, the front-wheel transmitter 21 is provided on a widthwise central portion (a smaller diameter portion) of the rim (wheel rim) 30 of the tire wheel 29. As shown in FIG. 5, the cylindrical valve main body 31, which houses the check valve, penetrates a through hole 32 from an inner side to an outer side of the tire wheel 29, the through hole 32 being formed on the rim 30. A nut 33, which is a member for connecting the cylindrical valve main body 31 and the front-wheel transmitter 21, is screwed onto a screw portion penetrating the rim 30 to the inner side, and the front-wheel transmitter 21 is connected to the valve main body 31. As a result, the front-wheel transmitter 21 is installed inside a tire (unillustrated) fitted on the tire wheel 29.

As shown in FIGS. 4 to 6, the front-wheel transmitter 21 is attached so that a longitudinal direction thereof may follow a circumference direction (a rotation direction when the vehicle travels) of the tire wheel 29. In addition, the front-wheel transmitter 21 is positioned within a region surrounded by a line 34 and the rim 30 so as not to stick out from the line 34, the line 34 connecting outer circumferential end portions of the rim 30.

Moreover, as shown in FIG. 6, the front-wheel transmitter 21 is connected to the valve main body 31 in a substantially central portion in the longitudinal direction thereof, and is oriented so that, of a sensor portion 211 and a battery 212 that supplies operating power to the sensor portion 211 constituting the front-wheel transmitter 21, the sensor portion 211 is located relatively frontward in the rotation direction R of the tire wheel 29, whereas the battery 212 is located relatively rearward in the rotation direction R of the tire wheel 29. Locating the battery 212 relatively rearward, which weighs more than the sensor portion 211, makes it easier to control vibration of the front-wheel transmitter 21 when the tire wheel 29 rotates.

In the following explanation of FIGS. 7 to 9, the same reference numerals as in FIGS. 1 and 2 denote the same or corresponding portions.

Figure 7:
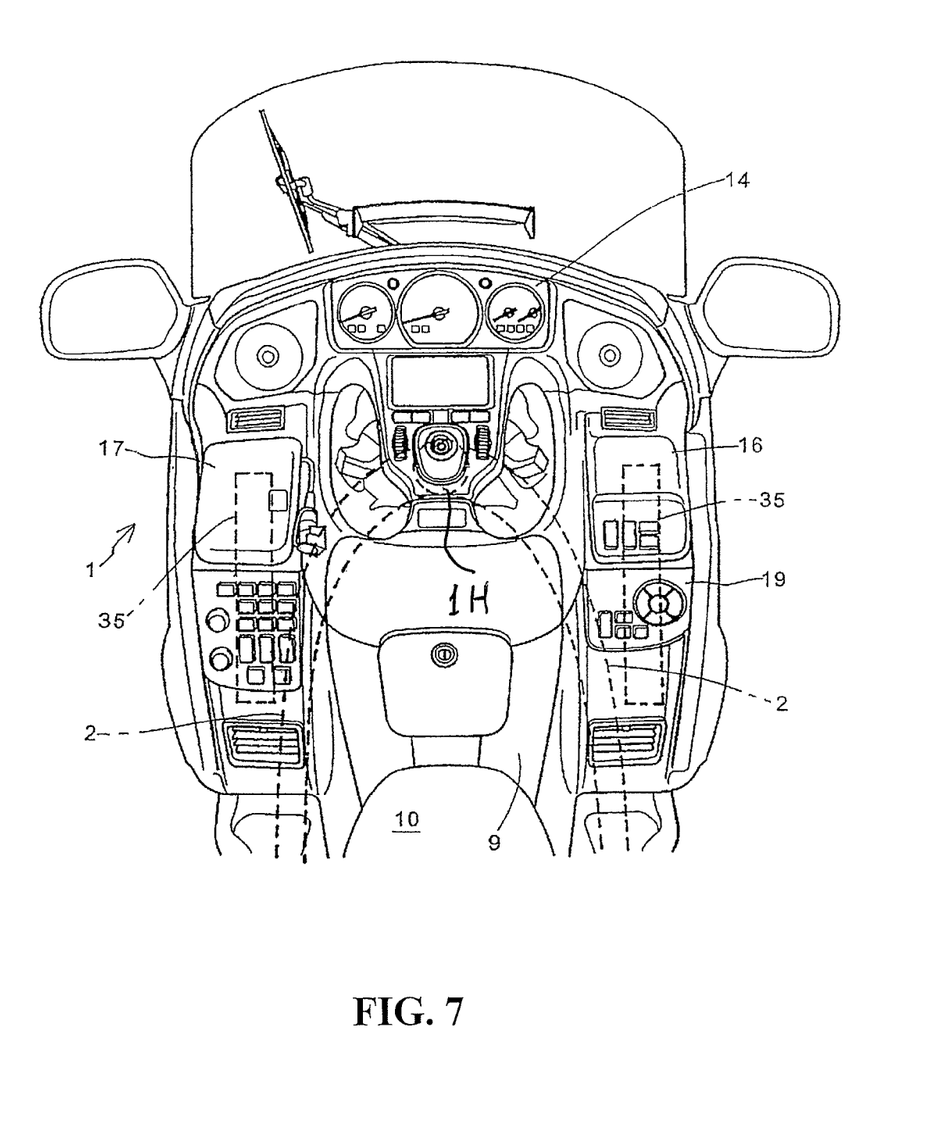
FIG. 7 is a top view of a front portion of the motorcycle.
Figure 8:
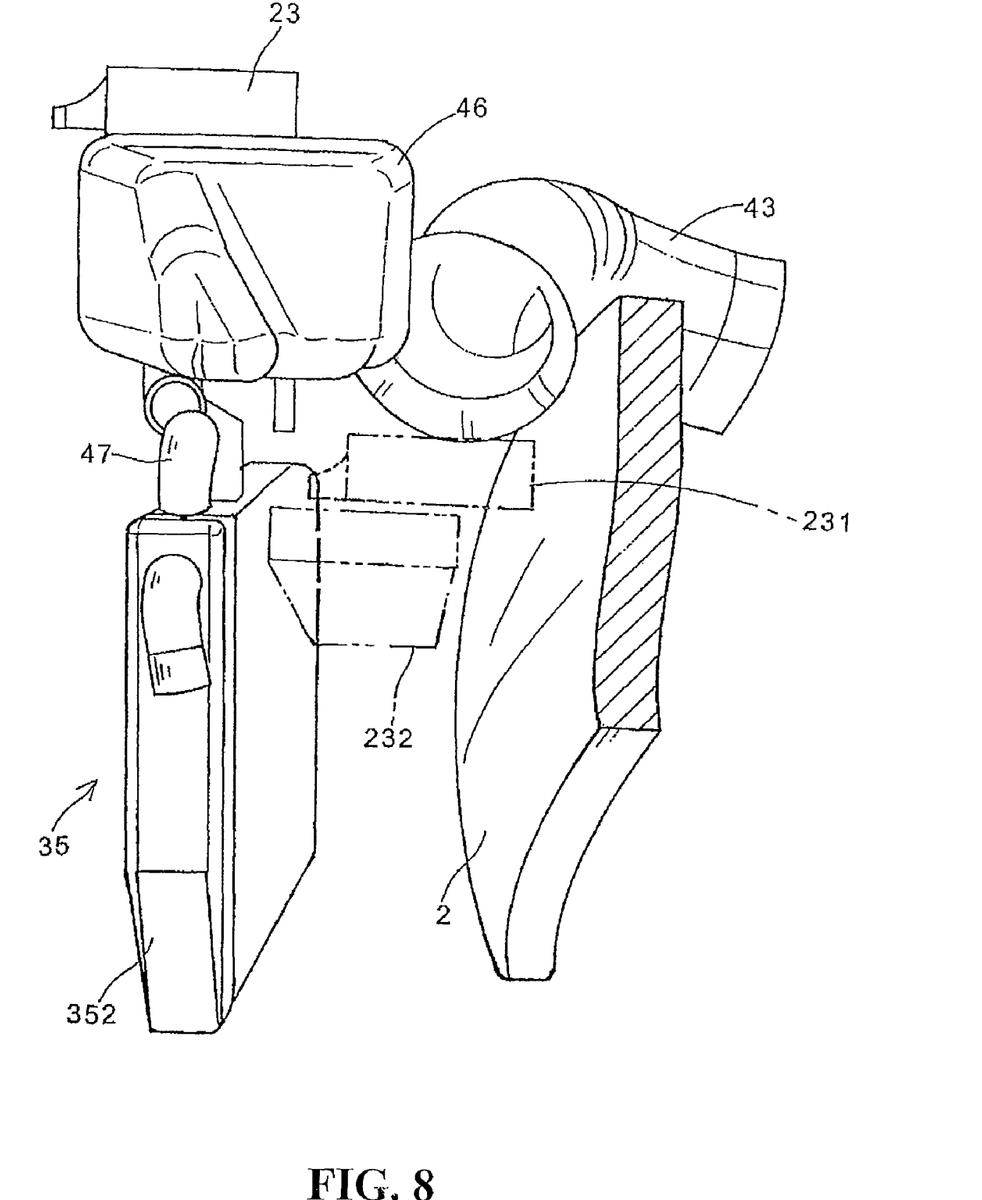
FIG. 8 is a front view of a main portion of the motorcycle, the front view showing an arrangement mode of a receiver of the tire inflation pressure detecting device.
Figure 9:
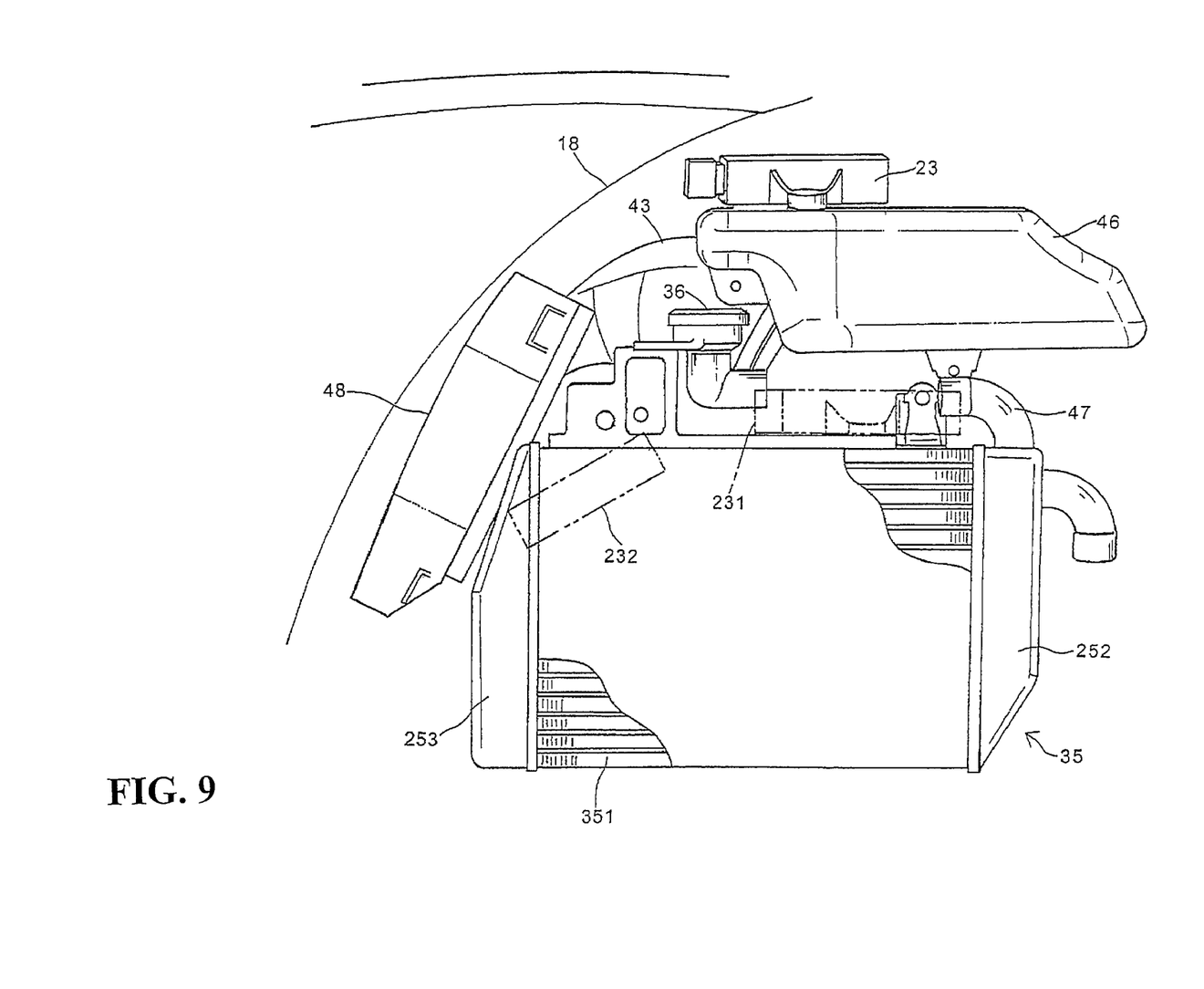
FIG. 9 is a side view of the main portion of the motorcycle, the side view showing the arrangement mode of the receiver of the tire inflation pressure detecting device.

As illustrated in FIGS. 7 to 9, the radiators 35 are arranged on right-hand and left-hand sides of the vehicle body, respectively, as a set, with each radiator 35 being positioned outer than the tube frame 2 in a width direction of the vehicle, below the side panel 18, and above the cylinder heads of the engine 5. The radiators 35 can be held by being connected to unillustrated brackets and stays which have been joined to the tube frames 2. As similar to a radiator generally used for a engine in a vehicle, each of the radiators 35 includes a radiator core (hereinafter, referred to simply as "core") 351 being a cooling channels shaped into a panel, and tanks 352 and 353 provided to the front and rear of the core 351 with respect to the vehicle body. Each of the radiators 35 is arranged so that a surface (a surface on the side shown in FIG. 9) of the core 351 is arranged along a side surface of the front cowl 15, inside the front cowl 15. That is, the radiator 35 has the surface of the radiator core 351 arranged along a front-rear direction of the vehicle body. Note that, tubes and fins in the core 351 are only partially illustrated in the drawings for the purpose of avoiding complexity.

As peripheral devices, the radiator 35 is provided with a radiator cap 36 attached to piping 47 connected to the tank 352, and a coolant reserve tank 46 arranged above the radiator 35. An air duct 43 is provided aside of the reserve tank 46. As illustrated in FIG. 9 denotes a navigation unit 48 performs navigation control in accordance with the operation of the navigation panel switch 19.

The receiver 23 of the tire inflation pressure detecting device is arranged above the reserve tank 46. Note that an attachment position of the receiver 23 is not limited to this space, and may be between the radiator 35 and the reserve tank 46. For example, as indicated by chained lines 231 and 232, the receiver 23 may be provided to the radiator 35, on an upper portion of the tube frame 2.

The receiver 23 can be fixed by use of a bracket and stay (unillustrated) that extend from the tube frame 2, for example.

Figure 10:
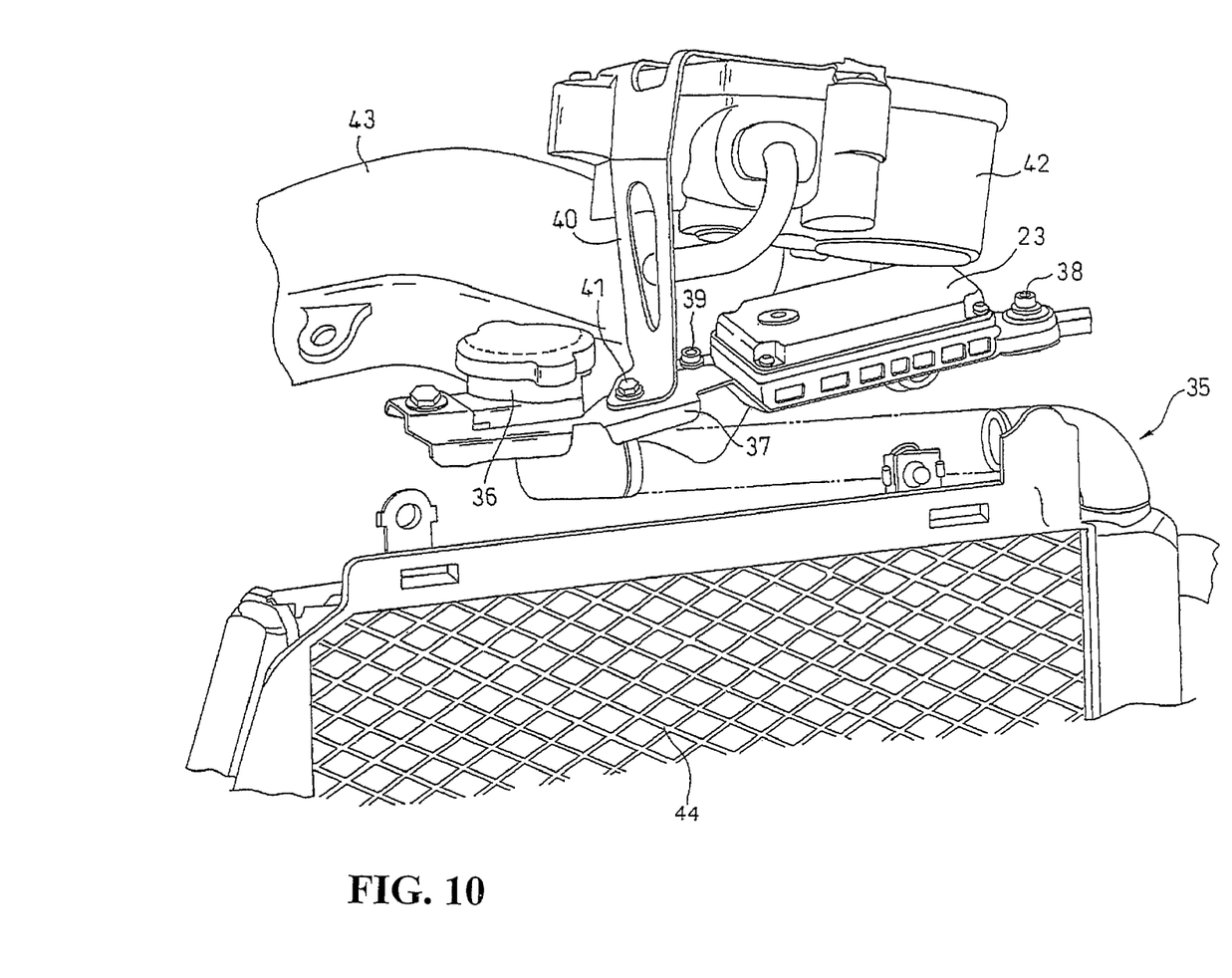
FIG. 10 is an enlarged perspective view showing an arrangement mode of the receiver according to a modification example.

Furthermore, a modification example in terms of the arrangement of the receiver 23 will be described. FIG. 10 is a perspective view showing an arrangement example of a receiver part according to the modification example. The same reference numerals used in FIGS. 8 and 9 denote the same or corresponding portions in FIG. 10. In this modification example, instead of the reserve tank 46, the cruise controller 42 is provided in a space where the reserve tank 46 is arranged in the aforementioned embodiment. In addition, a radiator grill (or a lattice-shaped cover) 44 for protecting the radiator 35 is provided on a front-surface (a side-surface of the vehicle body) of the radiator 35.

In FIG. 10, above the radiator 35, a stay 37 having one end connected to the radiator cap 36 and the other end connected to a bracket (unillustrated) of the tube frame 2 is provided. The receiver 23 is attached to the stay 37 by two bolts 38 and 39.

Furthermore, a stay 40 extending upward is connected to the stay 37 by a bolt 41, and the cruise controller 42 is attached to this stay 40. The air duct 43 is provided close to the cruise controller 42.

In essence, in an embodiment of the present invention, it is only necessary that the receiver 23, which receives signals indicating tire inflation pressures and transmitted from the front-wheel transmitter 21 and the rear-wheel transmitter 22, should be arranged in a position offset outward from the wheels (the front wheel and the rear wheel) of the motorcycle 1 in the vehicle-body width direction, and be provided frontward of the rider's seat 10. In the specific embodiment, the receiver 23 has been arranged in the vicinity of the cruise controller 42 and the reserve tank 46 under the lid 16 provided substantially horizontal to the side panel 18 provided to the front panel 15. However, the arrangement is not limited by this. The receiver 23 may be arranged in a space in the right-hand side of the vehicle body between a bottom portion of the storage pocket (unillustrated) openable and closable through the lid 17, and one of the radiators 35. In addition, in a case of employing a configuration in which a storage pocket is provided under the lid 16 in the right-hand side of the vehicle body by making the lid 16 openable and closable, the receiver 23 may be provided in a space between a bottom portion of this storage pocket and one of the radiators 35.

According to this embodiment, the transmitters 21 and 22 and the receiver 23 are provided at such positions that linear distances both from the front wheel 7 and the rear wheel 4 are short, and that radio waves are not easily blocked by the rider and the vehicle-body frame. Thus, favorable reception performances can be achieved. Since it is only necessary to provide the single receiver 23 common to the transmitters 21 and 22, securing of an installation space is easy, and attachment work can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire inflation pressure detecting device comprising:
   tire inflation pressure sensors;
   transmitters for transmitting signals indicating tire inflation pressures detected by the tire inflation pressure sensors, respectively; and
   a receiver for receiving the signals transmitted by the transmitters;
   a pair of one of the tire inflation pressure sensors and one of the transmitters being operatively connected to each of wheel rims of a front wheel and a rear wheel of a two-wheeled vehicle, wherein the receiver is arranged in a region outward, in a vehicle-body width direction, of a straight line connecting the wheel rims of the front and rear wheels, and forward of a rider's seat,
   wherein the two-wheeled vehicle includes:
      a pair of right and left main tubes extending obliquely downward and rearward to the right and to the left, respectively, from a head pipe; and
      a front cowl for covering an area extending from a front portion of the head pipe to front portions of regions outside of the respective main tubes in the vehicle-body width direction,
      a pair of right and left radiators, which are arranged, respectively, in the regions outside of the respective main tubes in the vehicle-body width direction,
      wherein a face of a radiator core included in each of the radiators is substantially opposed to the front cowl, and
      wherein the receiver is arranged in a space formed between one of the main tubes and the front cowl, and is attached by a stay to a radiator cap above one of the radiator cores.

2. The tire inflation pressure detecting device according to claim 1, wherein the receiver is arranged under a side panel covering an upper portion of a space between one of the main tubes and the front cowl.

3. The tire inflation pressure detecting device according to claim 2, wherein the receiver incorporates a receiving antenna.

4. The tire inflation pressure detecting device according to claim 2, wherein the receiver includes a microcomputer for comparing the tire inflation pressure indicated by the signal received by the receiver to a referential inflation pressure; inputting a result of the comparison to a meter unit of the vehicle; and causing the meter unit to give a predetermined warning indication.

5. The tire inflation pressure detecting device according to claim 1, wherein the receiver incorporates a receiving antenna.

6. The tire inflation pressure detecting device according to claim 5, wherein the receiver includes a microcomputer for comparing the tire inflation pressure indicated by the signal received by the receiver to a referential inflation pressure; inputting a result of the comparison to a meter unit of the vehicle; and causing the meter unit to give a predetermined warning indication.

7. The tire inflation pressure detecting device according to claim 1, wherein the receiver includes a microcomputer for comparing the tire inflation pressure indicated by the signal received by the receiver to a referential inflation pressure; inputting a result of the comparison to a meter unit of the vehicle; and causing the meter unit to give a predetermined warning indication.

8. A tire inflation pressure detecting device comprising:
   tire inflation pressure sensors;
   transmitters for transmitting signals indicating tire inflation pressures detected by the tire inflation pressure sensors, respectively; and
   a receiver for receiving the signals transmitted by the transmitters;
   a pair of one of the tire inflation pressure sensors and one of the transmitters being operatively connected to each of wheel rims of a front wheel and a rear wheel of a two-wheeled vehicle, wherein the receiver is arranged in a region outward, in a vehicle-body width direction, of a straight line connecting the wheel rims of the front and rear wheels, and forward of a rider's seat, wherein the two-wheeled vehicle includes:
a vehicle-body frame including a head pipe in a front portion of the vehicle body;
a pair of right and left main tubes extending obliquely downward and rearward to the right and to the left, respectively, from the head pipe; and
a front cowl for covering an area extending from a front portion of the head pipe to front portions of regions outside of the respective main tubes in the vehicle-body width direction,
a pair of right and left radiators, which are arranged, respectively, in the regions outside of the respective main tubes in the vehicle-body width direction,
wherein a face of a radiator core included in each of the radiators is substantially opposed to the front cowl; and
wherein the receiver is arranged in a space formed between one of the main tubes and the front cowl, and in a position above a reservoir tank connected to one of the radiators.

9. The tire inflation pressure detecting device according to claim 8, wherein the receiver incorporates a receiving antenna.

10. The tire inflation pressure detecting device according to claim 8, wherein the receiver includes a microcomputer for comparing the tire inflation pressure indicated by the signal received by the receiver to a referential inflation pressure; inputting a result of the comparison to a meter unit of the vehicle; and causing the meter unit to give a predetermined warning indication.

11. A tire inflation pressure detecting device comprising:
a front tire inflation pressure sensor operatively positioned within a front tire of a vehicle;
a rear tire inflation pressure sensor operatively positioned within a rear tire of the vehicle;
a front transmitter for transmitting signals indicating tire inflation pressure detected by the front tire inflation pressure sensor;
a rear transmitter for transmitting signals indicating tire inflation pressure detected by the rear tire inflation pressure sensor; and a single receiver which incorporates a single receiving antenna for receiving the signals transmitted by the transmitters;
said front tire inflation pressure sensor and said front transmitter being provided on a front wheel rim of a front wheel;
said rear tire inflation pressure sensor and said rear transmitter being provided on a rear wheel rim of a rear wheel;
wherein the single receiver which incorporates a single receiving antenna is arranged in a region outward, in a vehicle-body width direction, of a straight line connecting the wheel rims of the front and rear wheels, and forward of an operator's seat of the vehicle.

12. The tire inflation pressure detecting device according to claim 11, and further including a vehicle-body frame having a head pipe in a front portion of the vehicle body;
a pair of right and left main tubes extending obliquely downward and rearward to the right and to the left, respectively, from the head pipe; and
a front cowl for covering an area extending from a front portion of the head pipe to front portions of regions outside of the respective main tubes in the vehicle-body width direction, and
the receiver is arranged in a space formed between one of the main tubes and the front cowl.

13. The tire inflation pressure detecting device according to claim 12, and further including a pair of right and left radiators, which are arranged, respectively, in the regions outside of the respective main tubes in the vehicle-body width direction wherein a face of a radiator core included in each of the radiators is substantially opposed to the front cowl; and
the receiver is arranged above one of the radiators, and below a reservoir tank connected to the one of the radiators.

14. The tire inflation pressure detecting device according to claim 11, wherein the receiver is arranged under a side panel covering an upper portion of a space between one of left and right main tubes and a front cowl.

15. The tire inflation pressure detecting device according to claim 11, wherein the receiver includes a microcomputer for comparing the tire inflation pressure indicated by the signal received by the receiver to a referential inflation pressure; inputting a result of the comparison to a meter unit of the vehicle; and causing the meter unit to give a predetermined warning indication.

* * * * *